United States Patent
Rofrano

[19]

[11] Patent Number: 6,035,283
[45] Date of Patent: Mar. 7, 2000

[54] VIRTUAL SALES PERSON FOR ELECTRONIC CATALOG

[75] Inventor: John Joseph Rofrano, Mahopac, N.Y.

[73] Assignee: International Business Machines Corporation, Armonk, N.Y.

[21] Appl. No.: 08/948,719

[22] Filed: Oct. 10, 1997

[51] Int. Cl.[7] ............................................. G06F 19/00
[52] U.S. Cl. ............................................. 705/27; 705/26
[58] Field of Search .................... 705/27, 26; 706/45, 706/47, 50, 60

[56] References Cited

U.S. PATENT DOCUMENTS

| | | | |
|---|---|---|---|
| 4,879,648 | 11/1989 | Cochran et al. | 364/300 |
| 4,992,940 | 2/1991 | Dworkin | 705/26 |
| 5,319,542 | 6/1994 | King, Jr. et al. | 705/27 |
| 5,426,781 | 6/1995 | Kaplan et al. | 395/600 |
| 5,451,998 | 9/1995 | Hamrick | 348/13 |
| 5,528,490 | 6/1996 | Hill | 395/712 |
| 5,539,903 | 7/1996 | Kaplan et al. | 395/600 |
| 5,550,746 | 8/1996 | Jacobs | 364/479.01 |
| 5,603,031 | 2/1997 | White et al. | 395/683 |
| 5,608,899 | 3/1997 | Li et al. | 395/600 |
| 5,721,832 | 2/1998 | Westrope et al. | 705/27 |
| 5,852,814 | 12/1998 | Allen | 706/13 |
| 5,890,190 | 3/1999 | Suzuki et al. | 705/27 |

FOREIGN PATENT DOCUMENTS

WO 9612238  4/1996  WIPO ............... G06F 17/30

OTHER PUBLICATIONS

"Brightware, Inc. Aligns Partners and Products to Target Internet Marketing and Sales" Press Release Retreived Oct. 3, 1999 from Internet site (http:/www.brightware.com/news/press), Jan. 13, 1997.

"Brightware and American Finance Team to Provide Mortgages in Minutes on Internet's First Customer–Direct Mortgage Site" Press Release Retreived Oct. 3, 1999 from Internet site (http:/www.brightware.com/news/press), Feb. 28, 1997.

"Brightware, Inc. Integrates New Brightware 1.0 with Lotus Notes to Improve Customer–Direct Selling on the Net" Press Release Retreived Oct. 3, 1999 from Internet site (http:/www.brightware.com/news/press), Aug. 4, 1997.

"Brightware, Inc. Ships Brightware 1.0 to Automate Selling on the Net" Press Release Retreived Oct. 3, 1999 from Internet site (http:/www.brightware.com/news/press), Aug. 4, 1997.

*Primary Examiner*—Eric W. Stamber
*Assistant Examiner*—Penny Caudle
*Attorney, Agent, or Firm*—Steven J. Meyers

[57] ABSTRACT

This invention involves an electronic catalog system which employs the knowledge and experience of a "Sales Agent", which is provided to a computer data base, and used with an inference engine to assist and guide actual customers to products that they will most likely be interested in purchasing. This system is employs hypothetical questions and answers, based on the sales agents experience with generic customers, as well as criteria and constraints provided by both the Sales Agent and the electronic catalog content.

22 Claims, 2 Drawing Sheets

VIRTUAL SALES PERSON FOR ELECTRONIC CATALOG

BACKGROUND INFORMATION

1. Field of Invention

This invention involves an electronic catalog system which employs the knowledge and experience of a "Sales Agent", which is provided to a computer data base, and used with an inference engine to assist and guide actual customers to products that they will most likely be interested in purchasing. This system employs hypothetical questions and answers, based on the sales agents experience with generic customers, as well as criteria and constraints provided by both the Sales agent and the electronic catalog content.

2. Background Art

It is well recognized that procurement systems have traditionally been manual, labor intensive and quite costly operations. Suppliers, for example will do mass mailings of catalogs to potential customers, the customers would browse the catalogs and select items to be purchased and then the customer would complete a paper order form, or call the supplier to order the items. The entire process, from preparing the catalog to receipt of the order, is very labor intensive and often takes several weeks. If a supplier wanted to continually update his catalogs, or provide different price schedules to different customers, the printing, distribution and administrative costs would be substantial.

On a relatively small scale, some suppliers have offered catalogs through computer services, such as PRODIGY (TM). Employing PRODIGY (TM), a computer user can dial-up a service from home and select items to purchase from various catalogs maintained on the system. Upon selection, PRODIGY (TM) initiates the order with the supplier. While this has made significant improvements in typical procurement situations, there are still numerous needs remaining to be fulfilled.

Current electronic catalog systems which service the customer are generally deficient in several ways. First they are very generalized in the information they provide. These systems are not customer-centric in design. Thus they are generally product oriented and rely on human sales associates to make the final sale. Additionally, they do not rely on the personalized characteristics, needs or criteria of the specific buyer in order to narrow the choices of selection to be offered to the customer. This therefore requires excess time on the part of the customer or shopper to browse through the catalog in order to make the proper selection. The current electronic catalog systems are unable to advise shoppers on catalog navigation and product features when shopping for somebody other than themselves such as gift shopping. Thus current electronic catalog systems present all catalog shoppers with the same presentation format based on an internal machine organization of the catalog's content, rather than dynamically generated presentation format based on a customer's individualized personality, interests or needs and a sales representatives experience. This type of internet electronic catalog business limits the merchant's ability to sell since they still do not have the tools with which to fashion target-sales strategies. As a result the current electronic catalog systems are only slightly better than human-centric, direct-marketing strategies employing time consuming and expensive sales staff.

Customer interaction with current electronic catalog systems follows one of a plurality of pre-set paths along a decision tree, with the customer input typically being limited to responses to pre-defined choices. Interactive on-line catalog sales applications utilize user responses to questions, which may directly or indirectly relate to products in the category. The customer may indicate his or her interest in defined categories of product information and then be provided with appropriate screens displaying available products from this database. Such systems frequently attempt to direct the information retrieval by first gathering information about the customer and the customer's needs, before posting specific product questions, thereby establishing the appropriate path along the decision tree in advance.

Shortcomings of available prior art search and query tools include the fact that all customers must interact with the system using a limited set of pre-established interactions. In addition, all users must navigate through the pre-set paths and iterations even when the bulk of the information accessible via those paths would not be applicable to that customer's needs nor to the customer's level of familiarity with the available information. The latter shortcoming is particularly significant when one considers provisions of product information over the internet. With worldwide access, customers from geographically diverse locations will have different requirements on available product sets when interacting with the same electronic catalog. Different shoppers will also have different interaction parameters with respect to the level of product detail that they require. For example, when shopping for a camera, a professional photographer will approach the interaction with more detailed specification constraints than the shopper who is shopping for a camera as a gift. No currently available systems can accommodate any of the foregoing demands.

Thus, contemporary electronic catalog systems are typically lacking in the following areas. They do not facilitate customer oriented selling procedures that use custom personalized sales advice; but rather facilitate a more product-centric advertising process that relies on human sales representatives to make the actual sale. They present all catalog shoppers with the same presentation format based on an internal machine organization of the catalog content rather than a dynamically generated presentation format based on a customer's interests and the vast experience of Sales Representative's, stored in a data base, to devise product suggestions for the specific customer.

These current electronic catalog systems handicap and hamper their broad utilization and universal proliferation. Merchants, as a result, still have no tool with which to fashion target-sales strategies. This makes the electronic catalog a poor cousin to human-centric, direct-marketing strategies. They are also unable to incorporate cross-cultural, target-sales strategies into electronic catalogs that are accessed internationally over networks such as the world wide web.

As a further note, when shopping with a current electronic catalog, there is no one available to give the customer assistance short of calling an 800 number and trying to reach a real person for advice. This is not always practical since customers are often already using their telephone via their modem to access the catalog in an on-line system. Customers may also be shopping at off hours and providing 24 hour, 7 day a week service help may be cost prohibitive for merchants. In addition, the fact that one calls an 800 number staff line does not always get consistent advice. This is due in part to the fact that turnover is high for 800 staff numbers and quite often the shopper does not get a "knowledgeable" person to advise them. The alternative is that the shopper must be knowledgeable enough about products they wish to buy, or postpone their buy decision until a time which they can get help from a qualified sales person.

SUMMARY OF INVENTION

The current invention solves these problems by capturing the knowledge of the best sales agent and storing it with the electronic catalog. Normally this would require an artificial intelligence system which historically have been proprietary, hard to integrate into traditional systems, hard to use in general, and even harder to populate the knowledge base. Thus the current invention provides a way for employing the vast knowledge of a skilled sales agent to assist actual shoppers using an electronic catalog.

The instant invention uses a rational database with a very simple model to represent a sales agent's questions, probable or most the likely generic customer answers to the questions, and relations from the answers to features about the product that would be appropriate for the actual customer if they select a particular answer. This solution operates under two modes. The first or "Build Mode", involves the creation a knowledge base in the form of a question and answer tree with feature relationships. The second mode or "Run Mode", presents the questions and answers to the actual customer as well as constraining products by the feature relationship values.

DESCRIPTION OF THE INVENTION

Overview

Figure 1:
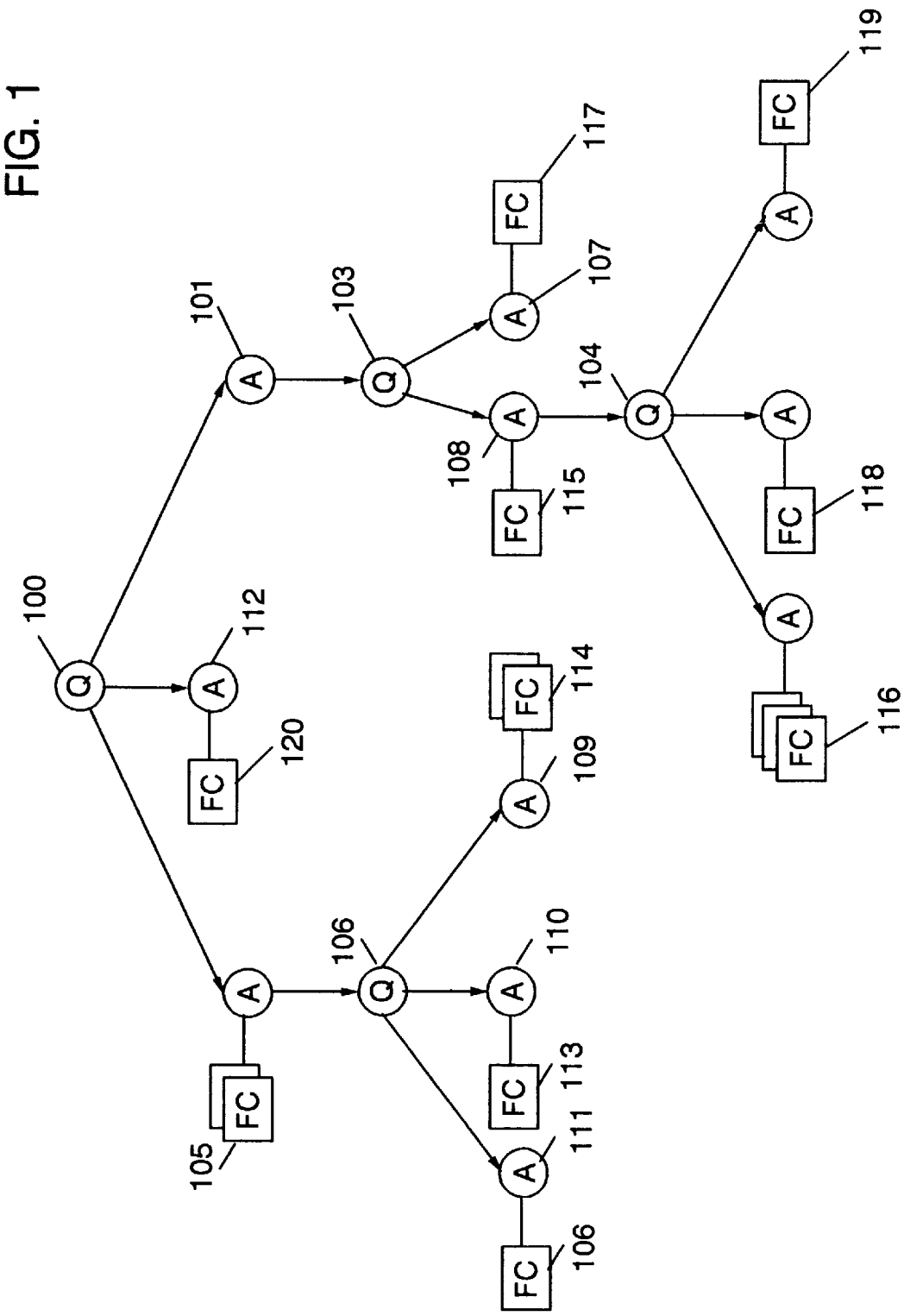
FIG. 1. Is an example of the "Build Mode" where question and answer tree is created, where the feature constraints imposed by the generic shopper and the catalog items.

During the initial or "Build Mode", a Sales Agent enters questions into a data collection tool or inference engine. These are questions that they would normally ask a generic customer if the customer were actually present. The Sales Agent starts with the same leading questions they would ask just as if the customer had walked into their store FIG. 1, at 100. Then the Sales Agent follows that by entering into the data base, possible answers at 101, 105 and 112 that they usually get from a generic customers in general, based on their sales experience. Answers can be followed up with more questions, at 103 and 106 which in turn, can have more answers at 107, 108, 109, 110, 111. Each answer has the ability to do two things. First is to store information about product features that would be appropriate if a customer selected that answer, and or secondly to link other lines of questioning (i.e. 103 to 104). The representation of these questions, answers and product "feature constraints" at 105, 106, 113, 114, 115, 116, 117, 118, 119 and 120, create a "Question and Answer Tree" structure of FIG. 1.

The term "feature constraints" are created by showing the Sales Agent all of the features for the category of products they are creating a question for. Thus when a feature is selected, all the unique values for that feature are displayed (i.e. such as a limitation of being red, blue, or green). The Sales Agent can then select another feature to relate to the answer. When the second feature is selected, the unique values presented will be constrained by the values selected for the previous feature (i.e., only those values for products which also have the previous values will be represented) In this way the sales person can never select values which result in no products remaining (i.e., mutually exclusive feature values cannot be selected). The actual customer is always left with some products after they have answered the questions.

Using the data in Table 1. as a reference, a merchant would be presented with the following possible features.

Format: 8 MM

Light: Built-in, Optional

Body: Compact, Standard

If they select Format as being 8 MM, as the first feature constraint for an answer, the possible feature values would be changed to the following:

Format: 8 MM

Light: Built-in, Optional

Body: Compact

TABLE 1

| ProductName | Format | Light | Body | Price |
| --- | --- | --- | --- | --- |
| CamCorder1 | 8MM | Built-in | Compact | 500 |
| CamCorder2 | 8MM | Optional | Compact | 450 |
| CamCorder3 | 8MM | Optional | Compact | 475 |
| HandyCorder1 | VHS | Built-in | Compact | 525 |
| HandyCorder2 | VHS | Built-in | Compact | 515 |
| HandyCorder3 | VHS | Optional | Standard | 410 |
| HandyCorder4 | VHS | Optional | Standard | 400 |

It should be noticed that Body has only one value "Compact" instead of two. This is because there are no products in the Table 1, where Format is equal to 8 MM and the Body is equal to Standard.

Detailed Description of the Invention

In the actual operation of the this invention, the "Run Mode", the root of the question and answer tree is found and the first question is presented to the actual customer along with its possible answer. The product count of all the products in the particular catalog is also on presented. When the actual customer selects an answer, if this answer has feature constraints associated with it, the products in that category are constrained by that feature and a new product count of the remaining products is displayed. The logic flow can be seen in the flow chart FIG. 2. When the actual customer has answered all the questions, the products remaining that meet all the criteria are presented in a list or by a side-by-side comparison.

A sample question, answer and feature constraint tree can be used as an example of the use of such a feature constraint tree regarding an actual customers interest in the purchase, for example, of a video camcorder using the products in Table 1. In this example Q: is a question, A: is an answer, C: is the feature constraint that will be applied to the product selection if the answer is picked. The system first asks the question, Q: Are you interested in high quality or compatibility?
  A: Interest in High Quality
    C: Format is 8MM
    Q: Will you be using this camera in doors mostly?
      A: Yes
        C: Light is built-in
      A: No
        C: Light is Optional
  A: Interest in Compatibility
    C: Format is VHS
    Q: Do you plan to take this camera on Vacation Trips?
      A: Yes
        C: Body is Compact (i.e. Weight & Size Considerations)
      A: No
        C: Body is standard.

When the actual customer answers high quality to the initial question, they are constrained by the feature that the only format that would allow high quality is 8 MM. This is because the Sales Agent data in the data base knows that 8 MM yields a high quality picture than VHS format. If the customer had answered compatibility, the products are constrained by format being VHS and they are asked a follow up question about the what size video camera body size is right for them. The system then asks the next question regarding the usage of the intended camcorder, which is will it be used extensively indoors. The answer given by the customer is yes. The resulting further constraint is that it must have a built-in light. It should be noted that at no time did the customer need to know anything about the various video tape formats of the products they are selecting They only answered questions about how they would use the video camera and the stored knowledge of the sales agent allowed the system to select the features that were appropriate for this specific actual customer's intended usage.

Figure 2:
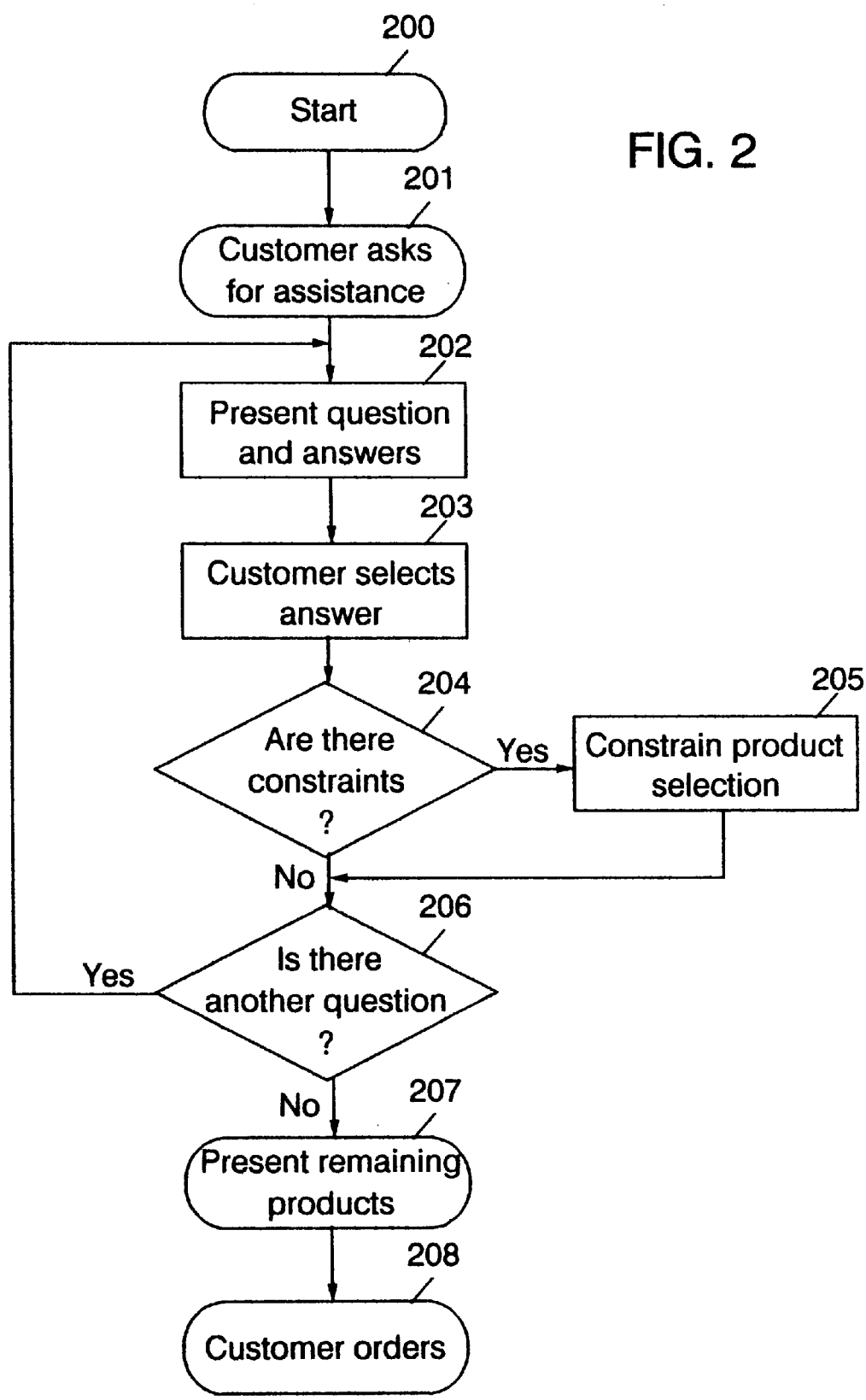
FIG. 2. Is the system logic flow chart where the actual customer has answered all the questions in the "Run Mode".

The logic flow chart that illustrates this system is shown in FIG. 2. The system is first started by the actual customer initiating a potential electronic catalog purchase 200, such as noted above about the purchase of a Video Camcorder by asking for assistance 201. The system then presents the question and answers, such as noted above regarding the customers interest in quality or compatibility. The actual customer then selects an answer 203 such as the interest in the quality parameter as opposed to compatibility. The system then asks a further question 204, regarding any constraints that the actual customer may place on the product. If the answer is yes, the constraint on product selection 205 is then entered into the data base for incorporation into the selections that are to be presented to the actual customer. If the answer to 204 is no, then the system presents the remaining products 207, for actual customer consideration. This is then followed by the actual customer ordering the product(s) of choice from the presentation 208.

However, if the answer to the question raised in 206 is yes, that being the case, the system has further questions to ask the customer, the flow shifts back to 202, where the new question and answer are presented and the process again proceeds to 203 where the actual customer again selects another answer.

It should be noted, as a further embodiment of this invention, that the manner of presentation of information to the actual customer can also be by audio techniques.

I claim:

1. A method of providing electronic catalog shopping comprising the steps of: creating a data base containing a Sales Agent's information on generic customer product interests and probable buying habits;
   providing said data base with product questions and anticipated probable answers to said product questions expected from said genetic customer, which are derived from said Sales Agent's prior sales experience, and storing said probable answers to said product questions, in said data base;
   employing a computer logic inference engine to present and advise an actual customer on specific suggested product choices based on said probable answers to said probable product questions provided for said generic customer.

2. The method of claim 1 wherein the means for presenting and advising an actual customer on specific suggested product choices, is by an audio technique.

3. The method of claim 1 wherein the means for presenting and advising an actual customer on specific suggested product choices, is by a graphics display device.

4. The method as defined in claim 1, wherein said computer logic inference engine incorporates specific Sales Agent's constraints and then advises and presents for said actual customer, the most likely recommended product candidate to consider for purchase.

5. The method of claim 1, wherein said computer logic inference engine also incorporates catalog content product constraints and then advise and present for said actual customer, the most likely recommended product candidate to consider for purchase.

6. The method as defined in claim 1, wherein the method can display a plurality of said product candidates for said actual customer to consider for purchase.

7. The method as defined in claim 2, wherein said system can ask a plurality of questions and provide answers based on a Sales Agent's constraints and catalog content product constraints in order to refine the product presentation to specific candidates.

8. An electronic catalog system comprising:
   means for a Sales Agent to provide data base information on generic customer product interests and probable buying habits;
   means for providing questions for a customer to answer, which questions are based on said generic customer product interests and supplying anticipated probable answers to said questions, which are based on a Sales Agent's prior sales experience and storing said probable answers to said product questions, in said data base; and
   computer logic inference means to present and advise an actual customer on specific suggested product choices based on said probable answers to said probable questions provided for said generic customer.

9. The electronic catalog system of claim 8, wherein said computer logic inference means incorporates specific Sales Agent's constraints and then advises and presents for said actual customer, the most likely recommended product candidate.

10. The electronic catalog system of claim 8, wherein said computer logic inference means also incorporates catalog content product constraints and then advises arid presents for said actual customer, the most likely recommended product candidate to consider for purchase.

11. The electronic catalog system of claim 10, wherein the system presents a plurality of product candidates for said actual customer to consider for purchase.

12. The electronic catalog system of claim 10, wherein said system asks a plurality of questions and provides answers based on a set of Sales Agents constraints and said catalog content product constraints in order to refine the product presentation to specific candidates.

13. A method of selling products using an electronic catalog comprising:
   providing in the electronic catalog products contained in a rational database;
   providing in the electronic catalog questions relating to the catalog products to be presented to a customer using the electronic catalog;
   supplying in the electronic catalog likely answers of the customer linked by feature constraints relative to the products contained in the data base;
   providing the questions to the customer using the electronic catalog;
   arranging the questions in a tree structure with the answers to the questions linked to further questions and proposed answers; and limiting product choices presented to the customer based on the customer's answers to the provided questions using the constraints invoked by the customer's answers.

14. The method of claim 13, wherein the step of providing the questions is an audible step.

15. The method of claim 13, including the step of limiting the questions asked to those that leave at least one available product for the customer to select by one or more possible answers.

16. The method of claim 15, including the step of using an inference engine in limiting the selection of goods in response to the answers of a customer to the questions provided.

17. An computer program product supplied on a medium for use in connection with a graphics display device to provide an electronic catalog comprising:

software for providing in the electronic catalog products contained in a rational data base;

software for providing in the electronic catalog questions relating to the catalog products to be presented to a customer using the electronic catalog;

software for supplying in the electronic catalog likely answers of the customer linked by feature constraints relative to the products contained in the data base;

software providing the questions and likely answers to the customer using the electronic catalog;

software for limiting the questions asked to those that leave at least one available product for the customer to select by each of one or more likely answers; and limiting product choices presented to the customer using the constraints associated with the likely answers selected by the customer.

18. The software product of claim 17, including software for enabling the customer to stop the progress of the questions at the customer's discretion; and software for providing products selected by the constraint associated with the answered questions.

19. An electronic catalog comprising:

means providing in the electronic catalog products contained in a rational data base;

means providing in the electronic catalog questions to a customer using the electronic catalog as to the products;

means supplying in the electronic catalog likely answers of the customer linked by constraints to the products contained in the data base;

means for arranging the questions and answers to the questions in a tree structure where answers to the questions link to further questions;

means for providing the questions to the customer using the electronic catalog; and means for responding to the answers provided by the customer to the questions by limiting product choices presented to the customer based on the constraints associated with the answers given by the customer.

20. The electronic catalog of claim 19, including limiting the questions asked to those that leave an available product for the customer to select after answering one of more of the possible answers.

21. A method of selling products using an electronic catalog comprising:

providing in the electronic catalog products contained in a rational database;

providing in the electronic catalog questions relating to the catalog products to be presented to a customer using the electronic catalog;

supplying in the electronic catalog likely answers of the customer linked by feature constraints relative to the products contained in the data base;

providing the questions to the customer using the electronic catalog;

stopping the progress of the questioning at the shoppers discretion; and presenting products selected limiting product choices presented to the customer based on the customer's answers to the provided questions using the constraints invoked by the customer's answers.

22. An computer program product supplied on a medium for use in connection with a graphics display device to provide an electronic catalog comprising:

software for providing in the electronic catalog products contained in a rational data base;

software for providing in the electronic catalog questions relating to the catalog products to be presented to a customer using the electronic catalog;

software for supplying in the electronic catalog likely answers of the customer linked by feature constraints relative to the products contained in the data base;

software providing the questions and likely answers to the customer using the electronic catalog;

software for arranging the questions and likely answers to the questions in a tree structure where the likely answers to the questions link to further questions; and software for limiting product choices presented to the customer based on the constraints associated with the likely answers selected by the customer.

* * * * *